United States Patent [19]

Geiser et al.

[11] Patent Number: 4,640,157
[45] Date of Patent: Feb. 3, 1987

[54] PROCESS FOR LOADING A LATHE WITH BARS TO BE MACHINED AND LOADING DEVICE FOR CARRYING OUT OF THE PROCESS

[75] Inventors: Markus Geiser, Péry; Claude Vandevoir, La Neuveville, both of Switzerland

[73] Assignee: Sameca S.A., Lamboing, Switzerland

[21] Appl. No.: 616,169

[22] Filed: Jun. 1, 1984

[30] Foreign Application Priority Data

Jun. 6, 1983 [EP] European Pat. Off. ........ 83810243.2

[51] Int. Cl.⁴ .............................................. B23B 13/02
[52] U.S. Cl. .......................................... 82/2.7; 414/17
[58] Field of Search .................. 82/2.5, 2.7, 1 C; 414/14–18

[56] References Cited

U.S. PATENT DOCUMENTS

| | | | |
|---|---|---|---|
| 2,577,203 | 12/1951 | Mariotie | 51/215 H |
| 3,095,771 | 7/1963 | Vann et al. | 82/34 A |
| 3,606,807 | 9/1971 | Rast | 82/38 R |
| 4,406,190 | 9/1983 | Mason | 82/2.5 |
| 4,445,697 | 5/1984 | Evans | 82/2.5 |

FOREIGN PATENT DOCUMENTS

| | | | |
|---|---|---|---|
| 0071518 | 2/1983 | European Pat. Off. | |
| 128257 | 12/1984 | European Pat. Off. | 82/2.7 |
| 1402204 | 11/1969 | Fed. Rep. of Germany | |
| 1918843 | 12/1970 | Fed. Rep. of Germany | |
| 194802 | 11/1982 | Japan | 82/2.5 |
| 7713034 | 5/1979 | Netherlands | |
| 691087 | 5/1953 | United Kingdom | |
| 895273 | 5/1962 | United Kingdom | |
| 1213973 | 11/1970 | United Kingdom | |

Primary Examiner—Lowell A. Larson
Assistant Examiner—Jerry Kearns
Attorney, Agent, or Firm—Wender Murase & White

[57] ABSTRACT

A process for loading a lathe in which a new bar to be machined is introduced laterally into a guide-bar device in form of a tube during the machining of a last piece at the end of a preceding bar. The new bar causes the ejection of the remnant of the preceding bar by pushing against the rear of the preceding bar. A device for loading a lathe with bars to be machined comprises a guide-bar device in form of a tube having two parts which can be opened for laterally introducing a new bar to be machined into the tube. The bar in the tube is fed by a hydraulically controlled push-piston. Pressure pistons press the two parts of the tube against each other in order to ensure a fluid tight seal. Return pistons are utilized radially move the upper part of the tube at the time of loading.

15 Claims, 10 Drawing Figures

PROCESS FOR LOADING A LATHE WITH BARS TO BE MACHINED AND LOADING DEVICE FOR CARRYING OUT OF THE PROCESS

BACKGROUND OF THE INVENTION

1. Field of the Invention

The present invention relates to a process for loading a lathe with bars to be machined, and more specifically to a process where the bars are held in a gripping unit of the lathe, each bar being guided in a guiding tube formed of two parts and in which a bar is pushed toward a head-stock of the lathe by a push-piston. A new bar to be machined is introduced laterally in the guide-bar device after the two guiding tube parts have been opened. The invention further relates to a loading device for loading a lathe with bars to be machined and more specifically to a loading device in which the guide-bar device is in the form of a tube for rotatingly supporting the bar to be machined in machine-oil which provides hydrodynamic support for the bar. Feeding of the bar in the tube is provided by a push-piston which supports the rear part of the bar and which is hydraulically controlled. The guiding tube is formed of two parts capable of being separated for laterally inserting a new bar to be machined in the guiding tube.

2. Background

Hydraulic guide-bar devices are known which are manually loaded and which permit great speeds of rotation of the bars to be attained. The remnant of a bar which has been machined is generally removed by a feed collet on the head-stock of the lathe. However, such non-automatic machines have long idle periods to accomodate stepping of the spindle and manual insertion of the next bar, all of which considerably increases the loading time and reduces the output of the machine.

Such a bar loading device for a machine-tool is described in U.S. Pat. No. 2,577,203 in which a guide-bar device is disclosed which comprises a segment pivoted to the end of a rocker arm. During normal working of the device the bar which is in the lowest portion of a bar magazine rests on a surface of the segment and a slide for holding the bars in the magazine is disengaged. At the time of loading, the segment is pivoted which opens the guide-bar tube and the lowest bar of the magazine falls laterally into the tube while the slide is advanced by a spring in order to hold the other bars in the magazine. A push-piston, controlled pneumatically, feeds the bar in the tube. At the time of loading the push-piston is retracted by vacuum. However, the guide bar tube described in the above-noted patent is not subjected to the pressure of machine oil for hydrodynamically supporting the bar to be machined, thus limiting the speed of rotation of the bar within guide-bar device.

SUMMARY OF THE INVENTION

It is therefore the object of the present invention to shorten the loading time and to increase the speed of rotation of the bar to be machined.

To achieve the above as well as other objects, the process according to the present invention is characterized in that during the machining of the last piece of a bar, a signal indicating termination of the bar and a signal indicating shutting of a gripping unit, cause the push-piston to retreat toward the rear part of the guide-bar device. The arrival of the push-piston at the rear part of the guide-bar device causes opening of the guiding tube, introduction of a new bar to be machined into the tube and closing of the tube. A signal indicating the closing of the tube and an "order of loading" signal delivered at the end of the machining of said last piece, causes the feeding of a new bar in the tube. Due to the fact that the new bar to be machined is introduced in the guide-bar device during the operation of machining of the last piece of the preceding bar, loading time is shortened.

The loading device according to the present invention is characterized in that in the closed state, the two parts of the guiding tube bear against each other on a common bearing surface under the influence of a pressure pistons or the like, acting on at least one of the two parts to make said tube fluid-tight and capable of supporting the oil pressure required for hydrodynamic support without leakage and to ensure retreat of the push-piston by vacuum. The speed of rotation of the bar to be machined can be increased because it is hydrodynamically supported by the oil pressure in its guiding tube. The feed collet of the lathe may be eliminated because the feed of the bar is entirely controlled by the push-piston in the guide-bar device, the remnant of the preceding bar being ejected by the new bar loaded in the device. The elimination of the feed collet contributes to an increase in the reliability of machining operations and to decreasing machining costs.

The invention will be described further by way of example and with reference to the accompanying drawings.

DESCRIPTION OF THE PREFERRED EMBODIMENT

Figure 1:
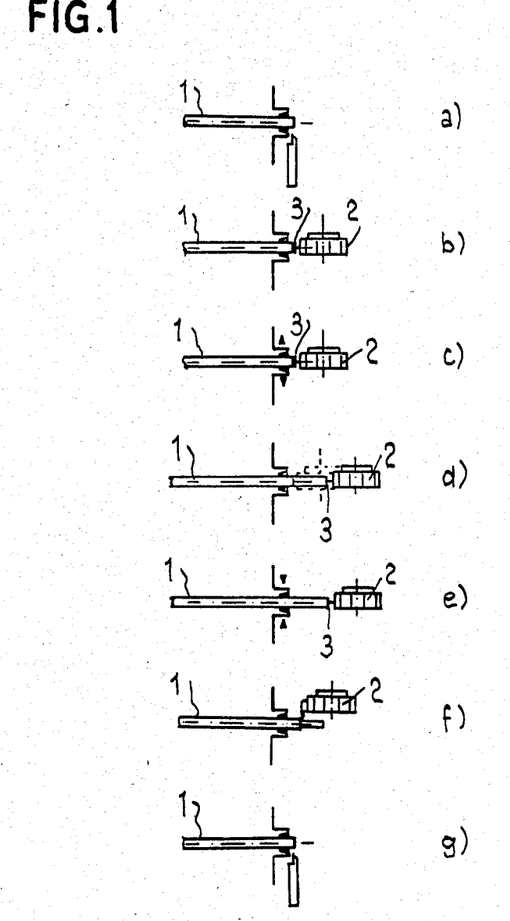
FIGS. 1–3 schematically illustrate the respective sequences of the machining operations of a long bar in an automatic working cycle, of the machining of the last piece in the automatic working cycle and of the subroutine for loading of a new bar.

FIG. 1 depicts the sequence of machining operations during an automatic working cycle of a long bar on a lathe which incorporates a loading device according to the invention. The lathe is preferably, but not necessarily, of the numerically controlled type. The series of steps are as follows:

(a) Terminating machining;
(b) Positioning a stop 3 of a turret 2 of the lathe opposite the bar to be machined 1;
(c) Opening the gripping unit for the bar;
(d) Retreating of the turret 2 and simultaneously feeding the bar toward the head-stock of the lathe while in contact with the stop 3 of the turret 2;
(e) Closing the gripping unit 1;

(f) Machining a new piece;
(g) Terminating machining.

As long as the bar to be machined is long enough, the above sequence of operations is repeated automatically, each complete cycle corresponding to the production of one piece. During this automatic cycle of operations, a push-piston in the guide-bar device continuously contacts the rear part of the bar to be machined.

Figure 2:
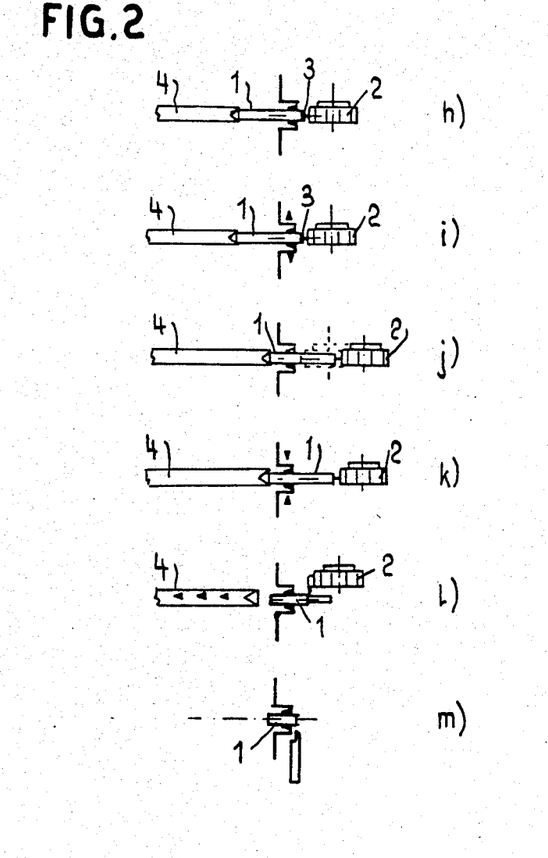

FIG. 2 shows the sequence of operations at the time of machining the last piece at the end of a bar;

(h) Positioning the stop 3 of the turret 2 opposite the bar to be machined 1. The push-piston 4 remains in contact with the rear of the bar 1;
(i) Opening the gripping unit;
(j) Retreating of the turret 2 and simultaneously feeding the bar toward the head-stock of the lathe by means of the push-piston 4 pushing against the stop 3 of the turret 2. The rear part of the push-piston 4, when passing in front of a detector, generates "bar termination" signal;
(k) Closing the gripping unit. Reception of the bar termination signal and of a signal indicating the closing of the gripping unit causes withdrawal of the push-piston which moves away from the head-stock of the lathe;
(l) Machining the last piece. The arrival of the push-piston at the rear of the guide-bar device causes the radial opening of the two parts of the tube, the lateral insertion of a new bar between the two parts and the subsequent closing of the tube;
(m) Termination of the machining. The reception of a "termination of machining" or "loading" signal and of a "tube closed" signal causes the newly inserted bar to be fed toward the head-stock of the lathe and progression of the operation to a subroutine for loading.

Figure 3:
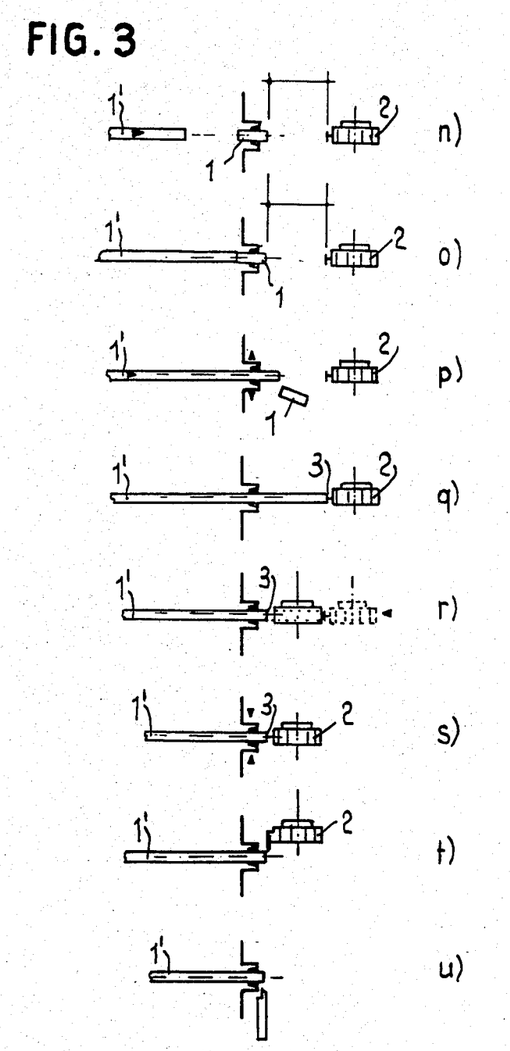

As illustrated in FIG. 3, the sequence of operations during the subroutine for loading is as follows:

(n) Positioning the turret 2 in front of the head-stock at a distance equal to the maximal length of the remnant of the preceding bar 1 plus a reserve, and feeding the new bar 1' into the guiding tube toward the headstock until the "bar termination" signal ends;
(o) Feeding the new bar 1' against the rear part of the remnant 1 and delivering a "pressure checking" signal indicating the end of the "bar termination" signal;
(p) Opening of the gripping unit, pushing the new bar 1' against the rear part of the remnant 1 and ejecting the latter;
(q) positioning the new bar against the stop 3 of the turret 2;
(r) Moving the turret toward the head-stock to position the new bar 1' in a working position;
(s) Closing the gripping unit on the new bar 1';
(t) Machining the front face of the new bar 1'; and
(u) Terminating the loading operation and proceeding to the "automatic cycle" corresponding to point (a) (FIG. 1) of the operation for machining a long bar in automatic cycle.

The process for loading according to the present invention shortens of the idle periods during the loading operation due to the fact that the new bar is inserted into the guiding tube during the machining of the last piece of the preceding bar. Because ejection of the remnant occurs at the time of opening of the gripping unit when the new bar pushes against the rear part of the remnant to eject it, the present invention also eliminates the need for feed collets normally installed on lathes for removing the remnants of the preceding bar. From the preceding description it should be appreciated that the process for loading in accordance with the present invention is preferably carried out on a numerically controlled machine because of the great flexibility of controlling such a machine.

Figure 4:
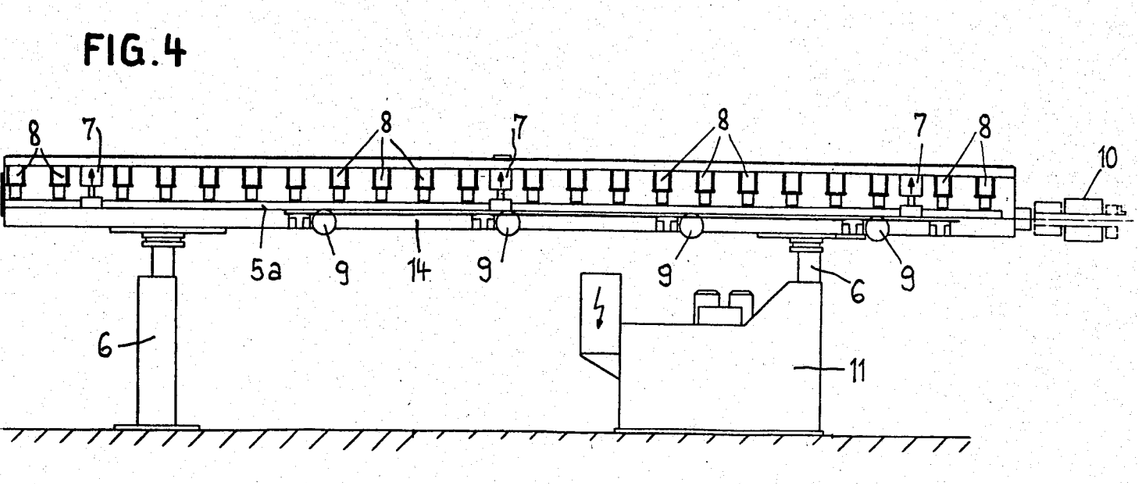
FIG. 4 is a schematic lateral view of a loading device according to the invention.

FIG. 4 is a schematic, lateral view of a loading device for a bar machining lathe according to the present invention. The loading device works in accordance with the above described process and comprises a guiding tube 5 comprising two parts, 5a and 5b (FIG. 7). The tube is mounted on supports 6. The upper part 5a of the tube is fastened to return pistons 7 which function to lift up the tube part 5a and separate it from the lower tube part 5b. Cams 9 operate at the time of loading to laterally and progressively introduce a new bar to be machined between the separated parts 5a and 5b. The tube 5 is part of a guide-bar device in which a push-piston 4 (FIG. 6), preferably hydraulically controlled, operates to feed the bar to be machined toward the machining station. The push-piston 4 also functions to support and center the rear part of the bar..Radial pipes 22 (FIG. 10) feed oil under pressure between the bar and the tube in order to create hydrodynamic support for the rotating bar in the tube. In order to ensure the tube 5 is fluid tight in its closed state the pressure exerted by the pistons 8 on the common bearing surface 5c of the parts 5a and 5b (FIG. 5) of the tube must be greater than the hydraulic pressure acting within the tube. The distribution of the pressure exerted on the tube 5 is determined by the arrangement of the pressure pistons 8 in a manner to ensure that the pressure is regularly distributed.

In order to open the tube 5 for the introduction of a new bar to be machined 1, the push-piston 4 is retracted, preferably by vacuum toward the rear end of the loading device. Therefore the tube 5 must also be air-tight. The required tightness is preferably provided by providing flat bearing surfaces 5c and by exerting sufficient pressure on them. Sealing joints may be used but are not obligatory. The loading device is axially aligned with and in immediate proximity with the head-stock 10. A hydraulic distributor 11 controls the pressure pistons 8, the return pistons 7, the push-piston 4 and the supply of oil in the closed tube.

Figure 5:
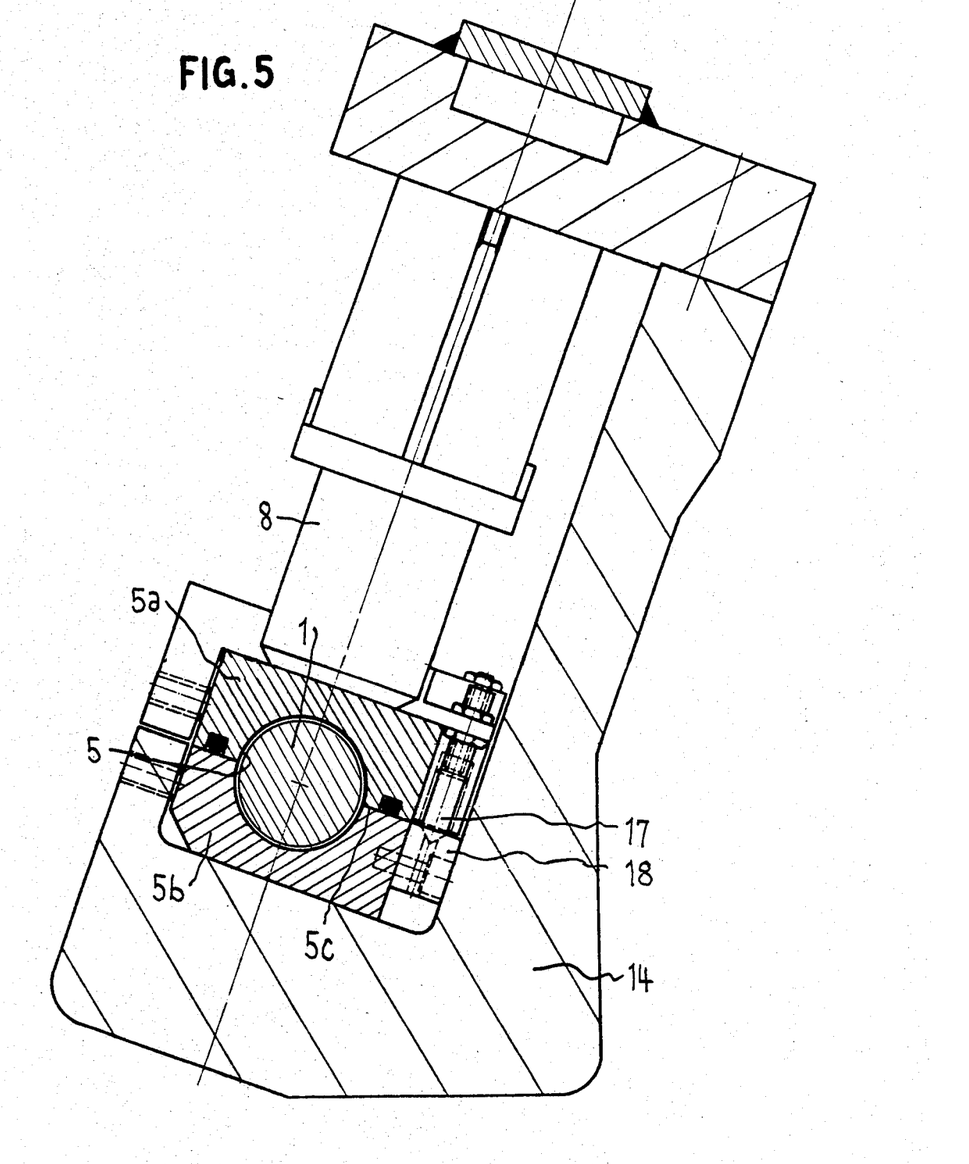
FIG. 5 is a cross section of the tube of the loading device of FIG. 4.

FIG. 5 shows a cross section of the tube 5 with a pressure piston 8 acting against the tube part 5a. The bar 1 is supported within the tube 5.

Figure 6:
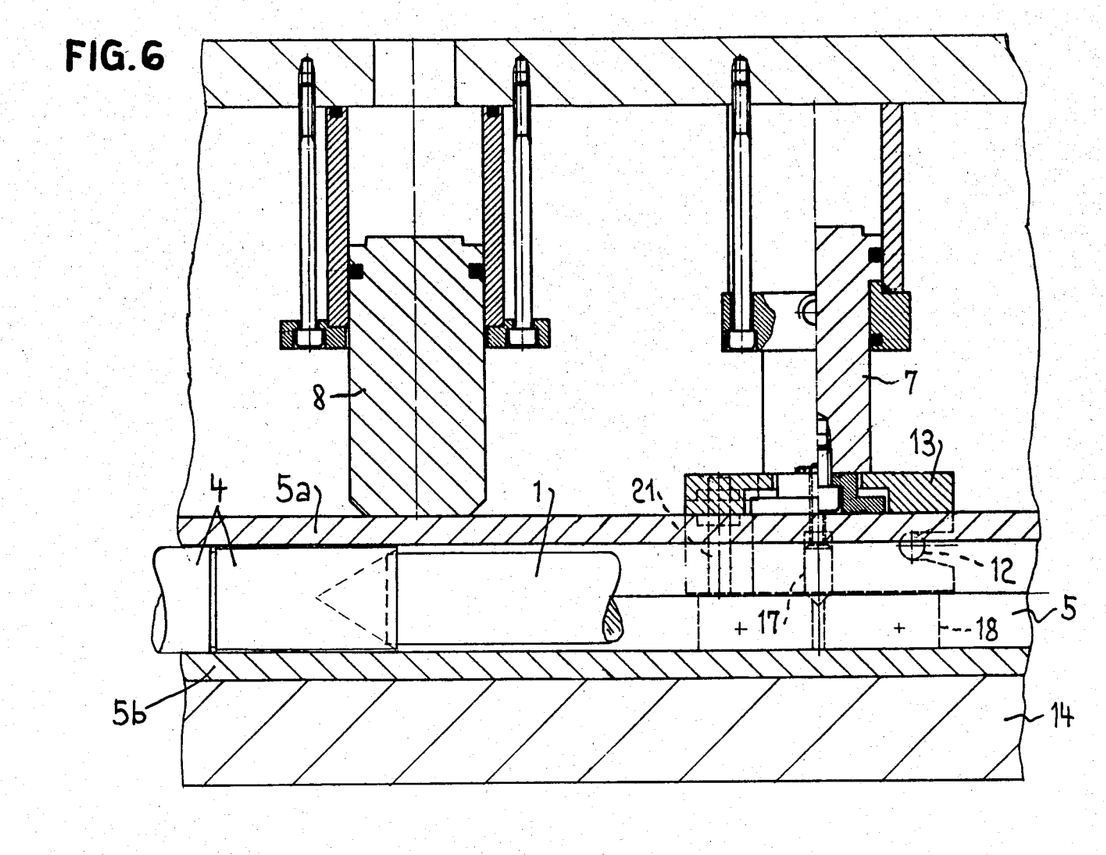
FIG. 6 shows the pistons for closing and opening the loading device.
Figure 7:
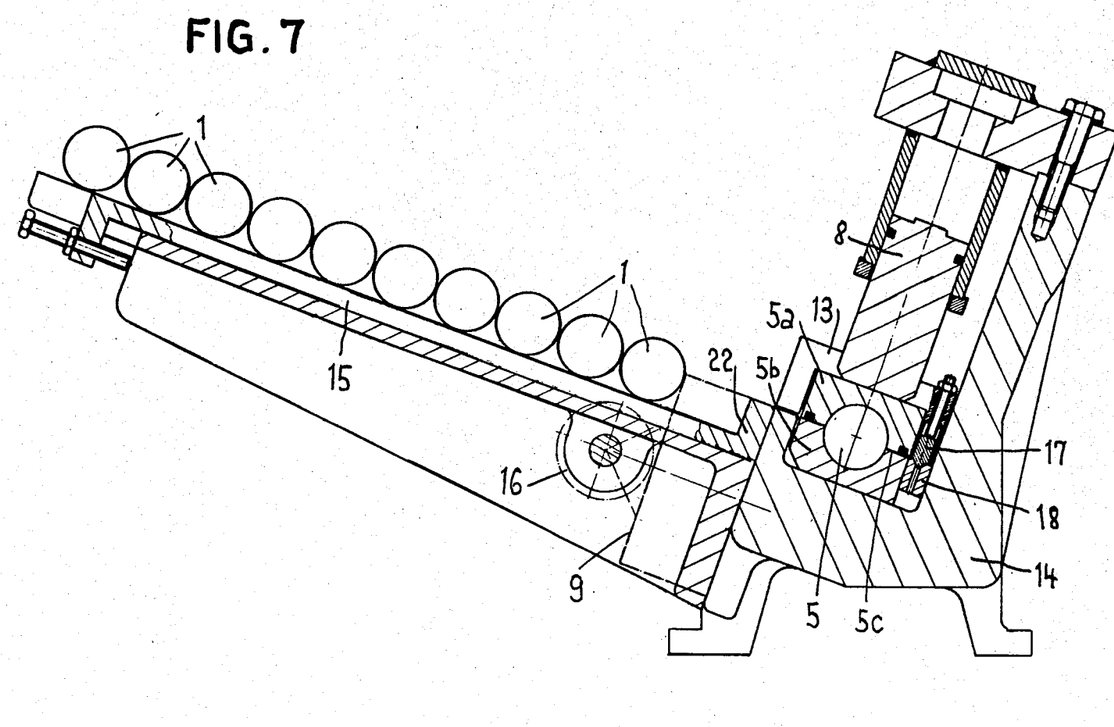
FIG. 7 is a front view of the loading device of FIG. 4.

FIG. 6 shows a cross section of the pistons 7 and 8 and of the tube 5. The return piston 7 is coupled to the upper part 5a of the tube 5 by means of a U-shaped yoke 13 extending along the upper part and on the two lateral sides of the part 5a. The yoke 13 is coupled to the part 5a by a punched opening in which a pin 12, fastened to the part 5a, is engaged. This arrangement facilitates changing the part 5a of the tube 5 as necessary to accomodate different diameter bars to be machined. During the loading operation, the pistons 7 are withdrawn by hydraulic pressure. These pistons then lift up the upper part 5a of the tube 5 in order to open the latter. FIG. 6 further shows proximity switches 21 which deliver a signal indicative of when the tube 5 is closed.

FIG. 7 is a front view of the loading device according to the invention. As alluded to above, the tube 5 comprises the fixed part 5b mounted on a frame 14 of the loading device and the mobile part 5a on which the pressure pistons 8 act and which, at the time of loading, is lifted up by the return pistons 7 for permitting the lateral introduction of a new bar into the fixed part 5b. The bars 1 to be loaded are arranged side by side on an inclined table 15. The axis of the bars is generally parallel to that of the tube 5. The lowest bar rests in a waiting position against a bearing surface of one or more cams 9 which rotate under the influence of a motor 16, each cam making a revolution at the time of loading. A stop 22, adjustable in accordance with the diameter of the bars to be machined, is provided on the table 15 in the vicinity of the cam 9. Centering pins 17 may be provided between the yokes 13 and the centering studs 18 of the tube to ensure perfect alignment between the parts 5a and 5b of the tube 5 in its closed state.

Figure 8:
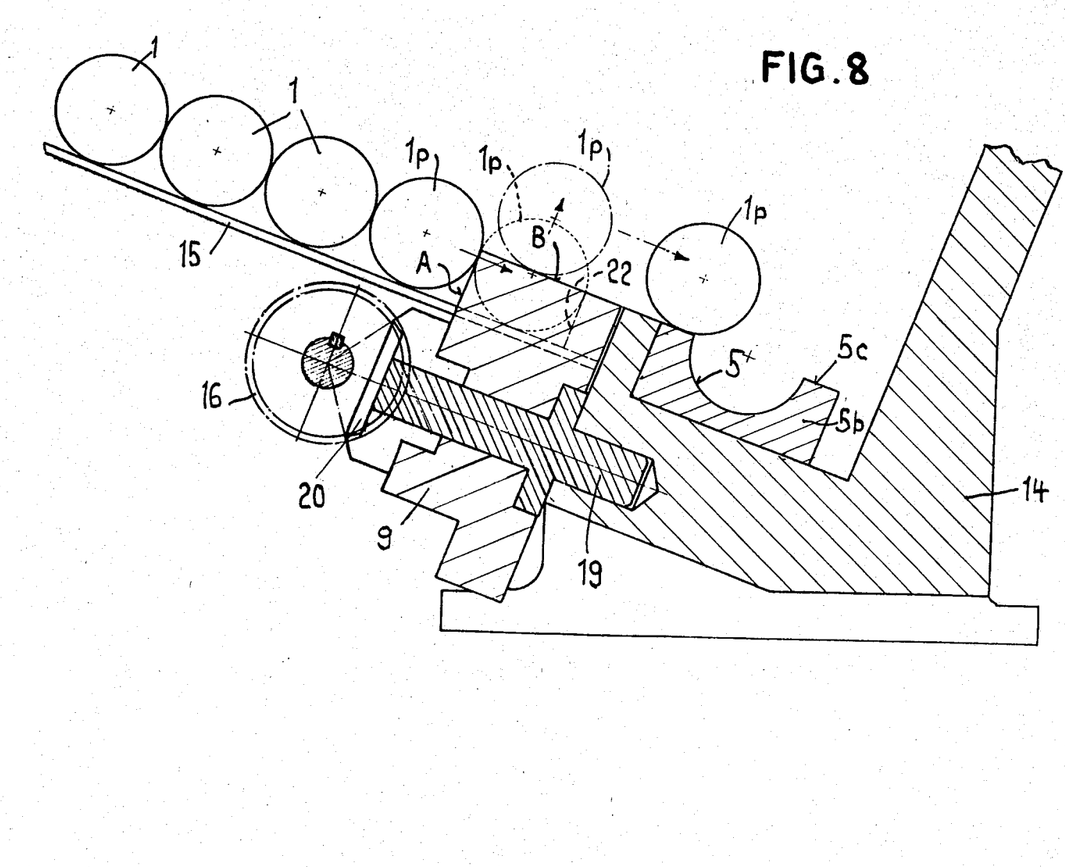
FIG. 8 is a cross sectional view of the loading cam.
Figure 9:
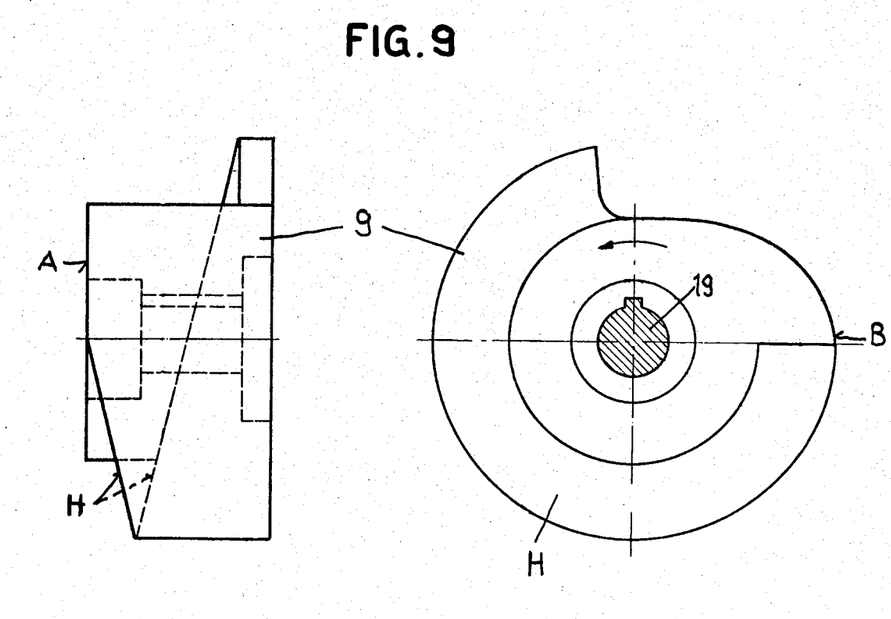
FIG. 9 illustrates the loading cam according to the present invention.

FIG. 8 shows a cam 9 mounted on a shaft 19 and set into rotation by a conical gear 20 driven by the motor 16. FIG. 9 shows a preferred configuration of a cam 9. As viewed in FIG. 8, the lowest bar 1p is in a waiting position against the bearing surface A of the cam 9 which is perpendicular to the axis of the cam.

At the time of loading, the cam is set into rotation and its helicoidal surface H ensures a progressive descent of the bundle of bars 1, 1p toward the tube 5. During this first phase of rotation, the lowest bar 1p is progressively brought against the adjustable stop 22. As the cam 9 rotates further, the second bar contacts the bearing surface A of the cam 9 and the rise B of the cam progressively lifts the bar 1p until it reaches a level from which it rolls above the stop 22 and the part of the frame 14 adjacent the stop 22 and gently into the fixed part 5b of the tube.

Figure 10:
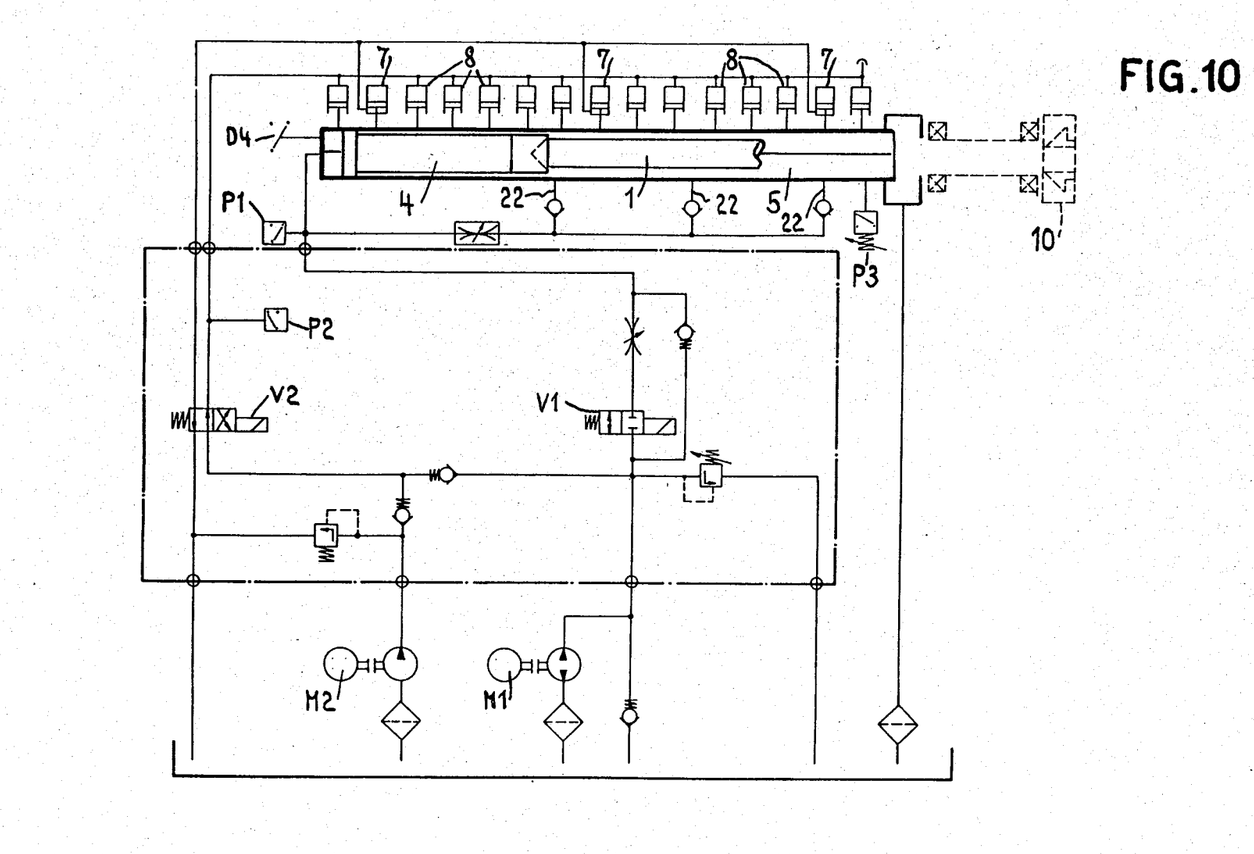
FIG. 10 is a simplified hydraulic diagram of a loading device according to the present invention.

FIG. 10 shows a simplified hydraulic diagram of the loading device. The system comprises a first pump M1 and a hydraulic valve V1 for controlling fluid flow to the rear part of the push-piston 4 for feeding the piston 4 in the tube 5 and for distributing oil between the tube 5 and the bar to be machined. A second pump M2 and hydraulic valve V2 controls fluid flow to either the pressure pistons 8 or the return pistons 7 when the mobile part 5a of the tube is to be retracted. A proximity switch D4 delivers a signal when the push-piston 4 reaches a stop position at the rear part of the tube 5. A pressure detector P3 delivers a "bar termination signal" when the rear part of the push-piston 4 is in the tube at the right hand side of the detector P3. A detector P1 monitors the pressure on the push-piston 4 and a detector P2 monitors the closing pressure of the tube. The working of the loading device will now be explained in the form of a summary of the loading sequences:

| Starting Position | |
|---|---|
| LOADING DEVICE | LATHE |
| Position "automatic" | "Automatic cycle", long bars |
| tube 5 closed, push-piston 4 bears against the bar | continuous machining |
| M2 switched on | |
| V2 switched out | |
| M1 forward motion | |
| V1 switched on | |
| At the time of reception of both signals: | |
| "bar termination" signals from detector by P3 | "gripping unit closed" signal by lathe control |
| M1 backward motion (vacuum) | |
| V1 switched on | |

| Starting Position | |
|---|---|
| LOADING DEVICE | LATHE |
| push-piston moves backward and actuates D4 | the lathe machines the last piece |
| M2 switched on | |
| V2 switched on | |
| The tube opens, the pistons 8 are without pressure, the pistons 7 are hydraulically controlled | |
| motor 16 is switched on, cam 9 rotates | |
| the tube closes, the pistons 8 are under pressure, the pistons 7 are without pressure | |
| At the time of reception of both signals | |
| "Tube closed" by the detector 21 | "loading" by lathe control |
| M1 forward motion | |
| V1 switched on | |
| the push-piston moves forward | the lathe jumps to the subroutine of loading indexing and positioning of the stop wait |
| At the time of reception of the signal | |
| "pressure checking" by P1 when the new bar bears against the remnant | |
| the loading cycle is terminated | opening of the gripping unit |
| the bar moves forward | ejection of the remnant |
| the bar moves backward | the stop moves forward shutting of the gripping unit termination of the "loading" operation commence "automatic cycle" operation |

We claim:

1. A method of loading a lathe having a gripping unit for gripping remnants of bar stock with new bar stock to be machined, said bar stock, during machining, being enclosed in a guiding tube having a stationary part and a mobile part, and being supported in said guiding tube and advanced toward the lathe by a supporting and advancing means, said guiding tube having a first end disposed adjacent said lathe and a second end remote from said lathe, said method comprising:

producing a first signal when said supporting and advancing means reaches a predetermined position adjacent the lathe such that only a remnant of bar stock is in the lathe;

determining if said gripping unit is firmly gripping said remnant;

withdrawing said supporting and advancing means toward of said guiding tube;

machining said remnant during said step of withdrawing when said first signal is being produced and said remnant is being firmly gripped by said gripping unit;

producing a second signal when said supporting and advancing means is withdrawn from said guiding tube to predetermined location;

opening the guiding tube by moving the mobile part thereof;

progressively and laterally introducing new bar stock to be machined into the stationary part of the guiding tube;

closing the guiding tube by returning the mobile part thereof;

producing a third signal indicative of completion of machining of the last piece of said remnant; and advancing said supporting and advancing means towards said new bar stock in the presence of said third signal when said guiding tube is closed.

2. The method according to claim 1, wherein said supporting and advancing means is operable to center the bar stock to be machined, and wherein the step of advancing further comprises hydraulically shifting said supporting and advancing means while rotatingly supporting the bar stock in fluid forming a hydrodynamic bearing.

3. The method according to claim 1, further comprising the step of numerically controlling the lathe.

4. The method according to claim 3, wherein said lathe includes a turret having a stop and a head stock and said step of numerically controlling comprises executing a loading subroutine which comprises:
 opening of said gripping unit;
 ejecting said remnant by pushing against a rear part thereof with said new bar stock;
 moving said new bar stock against said stop, said stop being spaced from the head-stock by a distance at least corresponding to a predetermined maximum length of a remnant;
 urging said new bar stock into a working position by advancing said turret toward the head-stock and closing the gripping unit; and
 machining a front face of the new bar stock.

5. The method recording to claim 1 wherein prior to the step of introducing, said new bar stock is supported on a distribution table inclined with respect to said guilding tube and the step of introducing further comprises moving said new bar stock from said distribution table onto said guiding tube by a cam means.

6. The method according to claim 5 further including the step of supporting said new bar stock during the step of moving.

7. The method according to claim 1 wherein the step of determining further comprises electrically monitoring the state of said gripping unit.

8. The process according to claim 1 further comprising the step of monitoring whether said guiding tube is closed.

9. A device for loading a lathe having a headstock with a new bar stock to be machined comprising:
 a guiding tube axially aligned with said head stock and having a stationary part and a moveable part, said guiding tube being operable to enclose a bar stock to be machined by the lathe, said bar stock being supported within said guiding tybe by a pressurized hydrualic fluid forming a hydrodynamic bearing;
 a feeding piston coaxially disposed within said guiding tube and operable to contact an end of said bar stock opposite said head stock for supporting and advancing said bar stock in said guiding tube in response to pressurized fluid;
 means for withdrawing said feeding piston from contact with said bar stock during machining of a remnant of bar stock and for advancing said feeding piston towards new bar stock to urge said new bar stock toward the headstock;
 means associated with said moveable part for separating said moveable part of said guiding tube from said stationary part to open said guiding tube;
 means laterally disposed adjacent to said stationary part for progressively loading said new bar stock into said stationary part of said opening guiding tube; and
 means for returning the moveable part of said guiding tube to said stationary part, said moveable and stationary parts of the guiding tube, in the closed condition thereof, being held together in fluid tight relationship by said returning means.

10. The loading device according to claim 9, wherein said returning means comprises a plurality of pressure pistons adapted to bear against said moveable part for pressing said moveable part against said stationary part; and wherein said separating means comprises at least one piston operably connected to said moveable part for moving said moveable part generally radially with respect to the axis of said guiding tube for permitting the lateral introduction of a new bar stock to be machined into the stationary part of the guiding tube.

11. The loading device according to claim 10, wherein a plurality of said pressure pistons are distributed along and act on a surface of said moveable part for tightly closing the guiding tube.

12. The loading device according to claim 9 further comprising alignment means on said moveable and stationary parts for ensuring correct alignment between the moveable and stationary parts of the guiding tube in said closed condition.

13. The loading device according to claim 9 further comprising a distribution table adjacent said guiding tube on which bar stock to be loaded is stacked, the axis of said bar stock being generally parallel to the axis of said guiding tube, and further comprising an adjustable stop associated with said distribution table for supporting the bar stock to be next loaded.

14. The loading device according to claim 13, further comprising a cam having an axial and a radial effect, said cam having a bearing surface perpendicular to the axis of said cam against which the next bar stock to be machined rests; said cam further having a helicoidal surface operable, in a first phase of rotation of the cam, to progressively and continously feed said bar stock until the bar stock adjacent said cam rests against said adjustable stop; said cam further having a radial rise, operable in a second phase of rotation, to lift the bar stock in contact with the adjustable stop over said stop and to gently deliver said bar stock into the stationary part of the guiding tube while retaining the remaining bar stock stacked on the table by means of the bearing surface of said cam.

15. The loading device according to claim 14, wherein said moveable prop comprises a cam having an axial and a radial effect, said cam having a bearing surface perpendicular to the axis of said cam against which the next bar stock to be machined rests; said cam further having a helicoidal surface operable, in a first phase of rotation of the cam, to progressively and continuously feed said bar stock until the bar stock adjacent said cam rests against an adjustable stop of said table; said cam further having a radial rise, operable in a second phase of rotation, to lift the bar stock in contact with the adjustable stop over said stop and to gently deliver said bar stock into the stationary part of the guiding tube while retaining the remaining bar stock stacked on the table by means of the bearing surface of said cam.

* * * * *